United States Patent Office 3,692,531
Patented Sept. 19, 1972

3,692,531
METHOD OF PREPARING PROTEIN FORTIFIED VEGETABLE PRODUCT
Wilhelmus Heusdens, Kirkwood, and Balagtas F. Guevara, St. Louis, Mo., assignors to Ralston Purina Company, St. Louis, Mo.
No Drawing. Filed July 24, 1969, Ser. No. 844,663
Int. Cl. A23l 1/10, 1/12, 1/30
U.S. Cl. 99—17
7 Claims

ABSTRACT OF THE DISCLOSURE

A process for producing nutritious protein fortified products by fortifying carbohydrate materials such as substantially gelatinized starch with a protein material which has not been heat gelled. The fortified carbohydrate material can be formed into a variety of food particles, such as pie shells, fortified fried potatoes, and snack chips, which exhibit an increased shelf life, improved organoleptic properties, and improved nutritional value. The fortified starch products can be formed into intermediate food products which reconstitute rapidly to form a cooked final product when subjected to heat.

---

Protein deficiency is a problem which confronts a large portion of the world's population, particularly that portion of the population which is not able to purchase protein in its more expensive primary forms such as milk, meat and fish.

A great deal of the world's protein deficiency could be met by protein sources of a less expensive nature than meat or fresh animal protein if an inexpensive secondary source of protein such as vegetable protein, fish protein concentrate, or microbial protein could be used. Food scientists have tried to solve the problem of meeting the protein requirements of the population by fabricating synthetic foods from secondary protein sources and by fortifying food products which are normally low in protein with protein from secondary sources.

Fabricated synthetic foods such as disclosed in U.S. Pat. 2,802,737, are increasing in importance and interest, but they have not yet made a significant contribution to the protein consumption level. Protein fortification has made some contribution to the protein levels in the diet. Bread is commonly fortified with whey solids and skim milk solids. Some breakfast cereals have added secondary protein.

We have discovered a unique process for fortifying food products with protein from secondary sources and a unique protein fortified product. The process involves fortifying carbohydrate materials such as a substantially gelatinized starch with a substantially undenatured protein material.

The carbohydrate material can be from a variety of sources. Starch containing materials such as grain and grain flours can be used. Wheat, rice, milo, barley, and corn are all sources which work readily in the process of the invention. Other sources which may be used are potatoes, tapioca, cellulosic vegetables such as carrots or beets, and fruit such as bananas, apples, or pears. Green bananas are particularly useful due to their high starch content. We anticipate that the source of carbohydrate used will depend on the geographical locality and will be determined by the dominant or most economical source.

The protein material can be from a variety of sources. Vegetable protein and protein isolates such as soy protein, sesame protein, or other vegetable sources may be used. Microbial protein extracts from yeasts may be used or fish protein concentrates.

The food products are formed by mixing the protein material with the carbohydrate and working the material into a homogeneous mixture. The carbohydrate may be in a cooked or an uncooked state. The protein which is mixed with the carbohydrate material should not be heat gelled, however. After the carbohydrate material and the protein material are mixed, they are formed into a desired shape, for example, a snack chip, and given a heat treatment to set the protein.

The heat treatment gives the material desirable taste and mouthfeel characteristics by fully gelatinzing the starch source, for example, by adding fat to the material or by cooking a crust on the surface of the material. In addition, we have found that the combination of cooking and the high initial content of the protein source which has not been heat gelled adds unexpected desirable characteristics to the cooked product in addition to the nutritional benefit from protein fortification. The protein material adds to the stability of the product on storage. Products produced according to the method of this invention have an increased shelf life; they remain crisp and palatable for periods of time which are much longer than products which do not contain the protein fortifying materials. The exact mechanism by which the increased shelf life is obtained is not clear. However, we believe that the protein material becomes resistant to moisture on being heat set and actually inhibits absorption of moisture by the food material. By forming the food product at temperatures below the point where the protein material will set or gel, preferably below 100° C., a product is formed under conditions which allow the protein fortified material to be readily worked. The formed product can then be given a cooking treatment to gel the protein-carbohydrate mixture. The cooking treatment toughens the protein and inhibits absorption of moisture by the product. The cooking step also adds crispness to the final product and reduces the moisture content. The final moisture content of the cooked product will be about 6% by weight.

The cooking step can be performed in a variety of ways: by conventional ovens, microwave ovens, or by frying. We have found that deep frying is particularly useful; it cooks the material quickly, reduces the moisture content, and adds fat to the material. The added fat improves the flavor of the cooked material. A deep fried snack food produced by the method of this invention has a pleasing taste, a very crisp mouthfeel, and has a greatly improved shelf life. The product with protein added has the additional advantage of absorbing less fat than starch. As a result, the final cooked product has a lower fat content than an all starch product. The mouthfeel and taste of the product is improved, because the fat content is low enough to prevent the product from feeling greasy in the mouth.

Food materials can be produced by the method of this invention which are designed to be frozen and later reconstituted by heat, such as frozen pie shells or filled puff pastry. The materials will reconstitute rapidly to form a palatable cooked product. For example, puff products produced by this method will reconstitute in about three minutes. This is much quicker than the twenty minutes required by a conventional product.

The following examples are included to demonstrate the invention to one skilled in the art and are not to be construed as limiting the scope of the invention.

EXAMPLE 1

Ground, frozen stew cut potatoes were cooked in a Brabender extruder cooker in two zones. The first zone was at a temperature of 100° C. and the second zone was at a temperature of 80° C. The cooked potatoes were extruded from the second zone at a temperature of 80° C. and a moisture content of about 54% by weight. Oone hundred parts by weight of isolated soy protein and 200 parts by weight of water were added to 500 parts of the cooked potatoes and mixed in a Brabender extruder fitted with a low pressure screw. The mixed material was extruded cold (temperature between 80 and 100° C.) through a one inch ribbon die. The ribbon was cut into 1½ inch pieces and deep fried in an oil bath at 170° C. The fried chips had a very crisp mouthfeel and a highly pleasing taste. The chips had a final content of 6% water, 20% fat, 20% protein, and 45% carbohydrate.

EXAMPLE 2

A mixed material prepared as described in Example 1 was formed into a puff shell product by cold extruding the material through a one inch diameter tube die. The extruded tube was filled with a cheese filling, cut into two inch lengths, and the lengths were closed at both ends. The filled pieces were deep fried in an oil bath at 170° C. The cooked pieces had a pleasant taste and mouthfeel. The puff shells were very crisp. The cooked pieces were frozen and were later prepared from consumption by heating the frozen pieces in a 205° C. oven for three minutes.

EXAMPLE 3

A mixed material prepared as described in Example 1 was cold extruded through a square die having ¼ inch sides. The extruded bars were cut into two inch lengths and deep fried in an oil bath at 170° C. The fried pieces had a crisp texture and a pleasing taste. The fried pieces could be frozen and reconstituted by heating in a 205° C. oven for about three minutes.

EXAMPLE 4

A mixed material prepared as described in Example 1 was formed into a pie shell and frozen. The frozen pie shell was prepared for use by heating in an oven at 205° C. for about ten minutes.

EXAMPLE 5

Three hundred grams of all purpose wheat flour was extruded through a Brabender extruder at a moisture content of 36% at a temperature of 140° C. Seventy grams of isolated soy protein and 200 grams of canned pear (moisture content of 85 to 90% by weight) were ground and mixed in with the gelatinized flour. The mix was cold extruded into ¼ inch rods. The rods were cut into 1½ inch pieces and deep fried. The deep fried pieces had a crisp, chewy texture and a pleasant fruit flavor. The fried pieces were judged to be an exceptionally palatable snack food.

EXAMPLE 6

Five hundred grams of rice flour was mixed with 100 grams of isolated soy protein and 500 grams of water. The mix was worked to a homogeneous consistency and cold extruded into ¼ inch diameter rods. The rods were cut into two inch lengths and deep fried. The fried pieces had a crisp mouthfeel and a pleasant taste. The fried pieces were judged to be an exceptionally palatable snack food.

We claim:

1. A method of improving the shelf life characteristics of a cooked food material having a carbohydrate base comprising: mixing a protein fortifying material with a gelatinized carbohydrate base selected from the group consisting of grain, fruit and starchy and cellulosic vegetables, the protein fortifying material being susceptible to gelling under the influence of heat, extruding the mixed protein and carbohydrate material at a temperature of less than 100° C. and forming a shaped food product containing between about 46–60% moisture, about 15–20% protein, and about 35–40% carbohydrate and cooking the shaped food product to gel the protein fortifying material.

2. The method of claim 1 wherein the carbohydrate base material is potato.

3. The method of claim 1 wherein the protein fortifying material is soy protein.

4. A method of preparing a protein fortified cooked food product having improved organoleptic properties, nutritional value, and shelf life from a carbohydrate food source selected from the group consisting of grains, fruits and starchy and cellulosic vegetables comprising: cooking the carbohydrate source to substantially gelatinize the same, mixing a protein fortifying material which has not been heat gelled with the cooked carbohydrate material, working the carbohydrate-protein mixture for a period of time sufficient to produce a uniform mass containing about 45–60% moisture, about 15–20% protein, and about 35–40% carbohydrate, forming the mixture into a shaped food product, and cooking the shaped food product to heat set the protein fortifying material.

5. The method of claim 4 wherein the protein fortifying material is soybean.

6. The method of claim 4 wherein the carbohydrate source is potato.

7. The method of claim 6 wherein the carbohydrate source is cooked at a temperature of less than 100° C.

References Cited

UNITED STATES PATENTS

| | | | |
|---|---|---|---|
| 3,185,574 | 5/1965 | Gabby et al. | 99—86 |
| 3,493,386 | 2/1970 | Pyne | 99—17 |
| 3,259,503 | 7/1966 | Tan et al. | 99—83 |

RAYMOND N. JONES, Primary Examiner

J. R. HOFFMAN, Assistant Examiner

U.S. Cl. X.R.

99—14, 83, 100 P

UNITED STATES PATENT OFFICE
CERTIFICATE OF CORRECTION

Patent No. 3,692,531   Dated September 19, 1972

Inventor(s) Wilhelmus Heusdens and Balaqtas F. Guevara

It is certified that error appears in the above-identified patent and that said Letters Patent are hereby corrected as shown below:

Column 2, line 10 - "gelatinzing" should be "gelatinizing".

Column 2, line 71 - "Oone" should be "One".

Column 3, line 20 - "from" should be "for".

Column 4, line 14 - "46-60%" should be "45-60%".

Signed and sealed this 8th day of May 1973.

(SEAL)
Attest:

EDWARD M. FLETCHER, JR.   ROBERT GOTTSCHALK
Attesting Officer          Commissioner of Patents